(12) United States Patent
Tsai et al.

(10) Patent No.: US 12,511,490 B2
(45) Date of Patent: Dec. 30, 2025

(54) FUNCTION MAP GENERATION METHOD AND SYSTEM

(71) Applicant: Wistron Corporation, New Taipei (TW)

(72) Inventors: Ping Chen Tsai, New Taipei (TW); Yin Min Lin, New Taipei (TW); Yi-Tsung Cheng, New Taipei (TW)

(73) Assignee: Wistron Corporation, New Taipei (TW)

(*) Notice: Subject to any disclaimer, the term of this patent is extended or adjusted under 35 U.S.C. 154(b) by 161 days.

(21) Appl. No.: 18/597,931

(22) Filed: Mar. 7, 2024

(65) Prior Publication Data

US 2025/0245438 A1 Jul. 31, 2025

(30) Foreign Application Priority Data

Jan. 30, 2024 (TW) ................................ 113103588

(51) Int. Cl.
*G06F 17/00* (2019.01)
*G06F 40/30* (2020.01)

(52) U.S. Cl.
CPC .................................. *G06F 40/30* (2020.01)

(58) Field of Classification Search
None
See application file for complete search history.

(56) References Cited

U.S. PATENT DOCUMENTS

| | | | | |
|---|---|---|---|---|
| 11,341,337 | B1 * | 5/2022 | Novak | G06F 40/30 |
| 11,494,851 | B1 * | 11/2022 | Novak | G06N 5/022 |
| 11,604,926 | B2 * | 3/2023 | Venkateshwaran | G06F 40/216 |
| 2022/0283826 | A1 | 9/2022 | Lavasani | |
| 2022/0358336 | A1 * | 11/2022 | Abolhasssani | G06N 5/01 |
| 2023/0044564 | A1 * | 2/2023 | Jezewski | G06F 40/30 |
| 2024/0020715 | A1 * | 1/2024 | Childress | G06F 40/30 |

OTHER PUBLICATIONS

Windyaiweb, "Beginner's Guide to Building a Website with AI and WordPress, How to Use 10WebAI to Build a WordPress Website in 5 Minutes, Even Beginners Can Become Experts!", retrieved on Sep. 8, 2023, Available at: https://www.youtube.com/watch?v=HX1rGrqvGnY, with partial English translation thereof, pp. 1-8.
Ryota; Yamada, "Linking Requirement Assurance to Quality Assurance", Complete Understanding in One Diagram—Fundamentals of SE (System Engineering), Mar. 1, 2022, with English translation thereof, pp. 1-14.

* cited by examiner

*Primary Examiner* — Satwant K Singh
(74) *Attorney, Agent, or Firm* — JCIPRNET

(57) ABSTRACT

A function map generation method and system are provided. The system executes the following steps using an artificial intelligence model. A difficulty point and first data related to the difficulty point are obtained from a first reply content of a first query corresponding to the difficulty point. A usage target and second data related to the usage target are obtained from a second reply content of a second query corresponding to the usage target. An implementation function and a target type are obtained based on the difficulty point and the usage target. A required function is obtained based on the target type. Semantic comparison between the implementation function and the required function is performed to obtain a difference set content. A function map is generated based on the target type, the implementation function, and the difference set content.

16 Claims, 11 Drawing Sheets

511

Question type: ▨▨▨▨▨▨▨▨▨▨▨▨▨▨▨▨▨
As a helpful and professional robot, you will be responsible for querying a usage question to obtain key information for website development. Please help me modify the above question and add a tone, one sentence will do.

510

Please help me capture nouns with following qualities in the content, and explain.
1. Proper noun and abbreviation
2. Strange
3. Inconsistent
Please follow the answer format below:
1. AMR-antimicrobial resistance, also known as microantibiotic resistance.
2. YYY-less common nouns need to search for relevant information online.
Content: ▨▨▨▨▨▨▨▨▨▨▨▨▨▨▨▨▨

521   520

The following content is the customer's response to the question "▨▨▨▨▨▨▨▨▨▨▨▨". Please help me evaluate whether the content mentions the relevant difficulty point and excerpt it, and capture the mentioned data.

Output format
With or without appearance: XX
Usage target: XX
Data: XX, XX (Please answer no if can't find.)

Content: ▨▨▨▨▨▨▨▨▨▨▨▨▨▨▨▨▨

542 — The following content is the customer's response to the question
"░░░░░░░░░░░░░░░░░░░░░░░░".Please help me evaluate whether the content mentions the relevant difficulty point and excerpt it, and capture the mentioned data.

Output format
With or without appearance: XX
Usage target: XX
Data: XX, XX (Please answer no if can't find.)

Content: ░░░░░░░░░░░░░░░░░░░░░░░░░░░░░░░░░░

541

552

550

Known proper noun:
░░░░░░░░░░░░░░░░░░░░░░░░░░

553 — The following content is the customer's response to the question
"░░░░░░░░░░░░░░░░░░░░░░░".Please help me evaluate whether the content mentions the relevant difficulty point and excerpt it, and capture the mentioned data.

Output format
With or without appearance: XX
Difficulty point: XX
Data: XX, XX (Please answer no if can't find.)

Content: ░░░░░░░░░░░░░░░░░░░░░░░░░░░░░░░░░░

At present, data that needs to be known is as follows:

▒▒▒▒▒▒▒▒▒▒▒▒▒▒ 562

Does the following mention source of relevant data?
Output format:
1. [Data]:[Source]

Content: ▒▒▒▒▒▒▒▒▒▒▒▒▒▒▒

561 — 560
571

Difficulty point: ▒▒▒▒▒▒▒▒▒▒▒▒▒▒
Usage purpose and audience: ▒▒▒▒▒▒▒▒▒▒▒
572

Please help analyze the above "difficulty point" and "usage purpose and audience" literally:
1. Function requirement: [Function 1]; [Function 2]
2. Website type: [Website type]

No explanation is required, just a list.

570

Please help list the functions that must be implemented in the UI/UX of the
581 — ⌈▒▒▒▒▒▒▒▒▒▒▒⌋ website, and classify according to high, medium, and low level of importance. Only parts with high levels of importance are displayed with the output format as follows:
High level of importance: XX, XX No explanation is required, just a list.

Q1: In order to better assist you in developing your website, I need to understand difficulty points you face to provide the most effective support. Please share some specific challenges that your website needs to solve, so I can provide more specific advice and assistance.

R1: Because our park is very large and a lot of information is managed by different departments, we wish to make a viewing panel to see various data, especially the flow of people, which includes the total park entry count, the number of people on site, and the average park stay duration.

A1: Understood. Your difficulty points and the mentioned data are as follows:
1. Difficulty point: park information is scattered in different departments and needs to be integrated; and it is necessary to track various data of the flow of people, which includes the total park entry count, the number of people on site, and the average park stay duration.
Data: the total park entry count, the number of people on site, and the average park stay duration.

Please confirm. If no change is required, please "confirm" website requirements.
If change is required, please enter according to the original format.

Confirm

Q2: Okay, please share with me who will be using the website? What is the purpose?

R2: The website will be monitored for internal use only and will not be accessible to external parties.

A2: Understood. The usage purpose and audience and the mentioned data are as follows:
1. Usage purpose and audience: website will be monitored for internal use only and will not be accessible to external parties. 2. Data: no specific data is mentioned.
Please confirm. If no change is required, please "confirm" website requirements. If change is required, please enter according to the original format.

Confirm

Q3-1: Okay, relevant data and files from the content you just mentioned are as follows:
1. Total park entry count
2. Number of people on site
3. Average park stay duration
What are the sources of the data and files?

R3-1: At present, the total park entry count and the number of people on site are counted by staff through counters.

FIG. 11A

The following data and sources are captured:
1. Total park entry count: counted by staff through a counter.
2. Number of people on site: counted by staff through a counter.
Please confirm. If no change is required, please "confirm" website requirements. If change is required, please enter according to the original format. ~A3-1

Confirm 

Understood. Could you please supplement the data source for the average park stay duration? ~Q3-2

R3-2~ The average park stay duration is roughly calculated through a sensor of an access control gate. 

The following data and source are captured:
1. Average park stay duration: calculated through a sensor of an access control gate.
Please confirm. If no change is required, please "confirm" website requirements. If change is required, please enter according to the original format. ~A3-2

Confirm 

Received. The function map of the website has been generated for you:
-Internal monitoring website
  - Integrate information from various departments within the park area
   Track the total park entry count, the number of people on site, and the average park stay duration
  - User authentication and permission management
  - Real-time monitoring data visualization
  - Alarm and notification system
  - Logging and auditing functions
  - (Existing) Count by staff through counters
     - Total park entry count
     - Number of people on site
  - (Existing) Calculate through a sensor of an access control gate
     - Average park stay duration
Please confirm website requirements. If change is required, please enter according to the original format. If no change is required, please "confirm" website requirements. The format is as follows:
- XXX
  - XXX
  ~~- XXX~~
- XXX
  - XXX
  - New item
~A4

Confirm 

FIG. 11B

FUNCTION MAP GENERATION METHOD AND SYSTEM

CROSS-REFERENCE TO RELATED APPLICATION

This application claims the priority benefit of Taiwan application serial no. 113103588, filed on Jan. 30, 2024. The entirety of the above-mentioned patent application is hereby incorporated by reference herein and made a part of this specification.

BACKGROUND

Technical Field

The disclosure relates to a human-computer interaction mechanism, and in particular to a function map generation method and system based on an artificial intelligence model.

Description of Related Art

In today's era of comprehensive digital transformation, the user interface (UI) and the user experience (UX) of a website have become very important. In addition to affecting the direct operation experience, the UI and the UX are also directly related to efficiency. For example, a management website must present data according to the level of importance and be able to quickly link to associated data. Therefore, a website with a convenient operation procedure and an intuitive and easy-to-manage dashboard has become the main topic of webpage design. However, to achieve the above objectives, a UI/UX designer must intervene to repeatedly interview a customer to accurately capture requirements, which undoubtedly increases the time cost of website development.

In a general UI/UX design and development procedure, the UI/UX designer conducts a preliminary requirement interview with the customer, compiles a function map of the website according to a function type, such as image monitoring, device control, and event notification, and produces the first version of a wireframe for the customer to confirm the function. The wireframe has no visual elements and is intended to present the structure, functionality, and procedure of the website. If the customer has new requirements or opinions, the UI/UX designer conducts an interview again, updates the function map, reproduces the wireframe, and repeat the procedure until a consensus is reached. Finally, a website development team enters a UI design stage based on the wireframe and produces a mockup or even a prototype.

Throughout the design and development cycle, the requirement interview is an important and inevitable procedure in the entire development process. However, since the customer may not know his own requirements, multiple interviews need to be conducted to elicit the core requirements and supplement necessary relevant information. Often, due to different understandings between the two parties, revisions and reconfirmations are required until a consensus between the two parties is reached before proceeding with the UI design and development. Therefore, the requirement interview takes up a lot of time in the development cycle, and the requirement interview is a cumbersome and not highly standardized procedure, making it difficult to improve efficiency.

SUMMARY

The disclosure provides a function map generation method and system based on an artificial intelligence (AI) model, which can effectively reduce the time cost of requirement interviews.

A function map generation method based on an artificial intelligence model includes the following steps, which are executed through a processor. In a first query step, a difficulty point and first data related to the difficulty point are obtained from a first reply content of a first query corresponding to the difficulty point using the artificial intelligence model. In a second query step, a usage target and second data related to the usage target are obtained from a second reply content of a second query corresponding to the usage target using the artificial intelligence model. A completeness judgment step includes the following steps. In a function induction step, an implementation function and a target type are obtained based on the difficulty point and the usage target using the artificial intelligence model. In a function association step, a required function is obtained based on the target type using the artificial intelligence model. In a function comparison step, semantic comparison between the implementation function and the required function is performed to obtain a difference set content using the artificial intelligence model. In a function map generation step, a function map is generated based on the target type, the implementation function, and the difference set content.

In an embodiment of the disclosure, the first query step includes: generating a prompt corresponding to the first reply content; executing a noun capture program based on the prompt corresponding to the first reply content through the artificial intelligence model to obtain a first noun response result; and executing a semantic capture program through the artificial intelligence model to obtain the difficulty point and the first data related to the difficulty point based on the first reply content and the first noun response result.

In an embodiment of the disclosure, the second query step includes: generating a prompt corresponding to the second reply content; executing the noun capture program based on the prompt corresponding to the second reply content through the artificial intelligence model to obtain a second noun response result from the second reply content; and executing the semantic capture program through the artificial intelligence model to obtain the usage target and the second data related to the usage target based on the second reply content and the second noun response result.

In an embodiment of the disclosure, the function map generation method further includes a third query step, including: receiving a third reply content of a third query corresponding to a data source; generating a prompt corresponding to the third reply content; executing the noun capture program based on the prompt corresponding to the third reply content through the artificial intelligence model to obtain a third noun response result from the third reply content; and executing the semantic capture program through the artificial intelligence model to obtain source information based on the third reply content and the third noun response result.

In an embodiment of the disclosure, the function map generation step further includes updating the function map based on the source information.

In an embodiment of the disclosure, the function map generation step further includes: generating a prompt corresponding to the difficulty point and the usage target; and executing a function induction program based on the prompt using the artificial intelligence model to obtain the implementation function and the target type.

In an embodiment of the disclosure, the function association step includes: generating a prompt corresponding to the target type; and executing a function association program based on the prompt using the artificial intelligence model to obtain a required function.

In an embodiment of the disclosure, the function map generation step includes: generating the function map based on the implementation function and the target type after the function induction step; and updating the function map based on the difference set content after the function comparison step.

A function map generation system based on an artificial intelligence model of the disclosure includes: an artificial intelligence model; an interactive interface; and a processor, coupled to the artificial intelligence model and the interactive interface. In response to the interactive interface receiving a first reply content of a first query corresponding to a difficulty point, the processor is configured to obtain the difficulty point and first data related to the difficulty point from the first reply content using the artificial intelligence model. In response to the interactive interface receiving a second reply content of a second query corresponding to a usage target, the processor is configured to obtain second data for representing the usage target and related to the usage target from the second reply content using the artificial intelligence model. The processor is further configured to: obtain an implementation function and a target type based on the difficulty point and the usage target using the artificial intelligence model; obtain a required function based on the target type using the artificial intelligence model; perform semantic comparison between the implementation function and the required function to obtain a difference set content using the artificial intelligence model; and generate a function map based on the target type, the implementation function, and the difference set content.

Based on the above, capturing important information to be organized into the function map using the artificial intelligence model can quickly and accurately capture customer requirements, reduce the number of back-and-forth interviews between the designer and the customer, and effectively reduce the time cost of requirement interviews.

BRIEF DESCRIPTION OF THE DRAWINGS

FIG. 5A to FIG. 5C are schematic diagrams of multiple prompt templates according to an embodiment of the disclosure.

FIG. 11A and FIG. 11B are schematic diagrams of a content presented by an interactive interface according to an embodiment of the disclosure.

DESCRIPTION OF THE EMBODIMENTS

Figure 1:
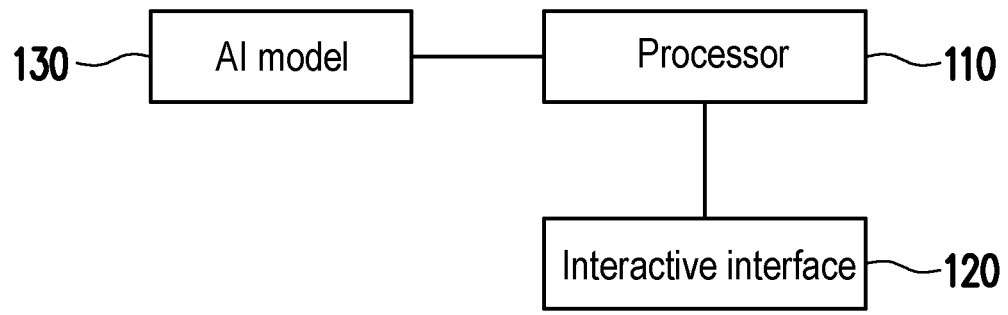
FIG. 1 is a block diagram of a function map generation system according to an embodiment of the disclosure.

FIG. 1 is a block diagram of a function map generation system according to an embodiment of the disclosure. Please refer to FIG. 1. A function map generation system includes a processor 110, an interactive interface 120, and an artificial intelligence (AI) model 130. The processor 110 is coupled to the interactive interface 120 and the AI model 130.

The processor 110 is, for example, a central processing unit (CPU), a physical processing unit (PPU), a programmable microprocessor, an embedded control chip, a digital signal processor (DSP), an application specific integrated circuit (ASIC), or other similar devices.

The interactive interface 120 is a user interface (UI), which is a medium for interaction and information exchange between the processor 110 and a user. For example, the interactive interface 120 includes a human-computer interaction (HCI) and graphical user interface (GUI). In an embodiment, the interactive interface 120 may be implemented by a display and an input device or may be implemented by a touch screen.

The AI model 130 may be disposed in the same electronic device as the processor 110. In addition, the AI model 130 and the processor 110 may also be disposed in different electronic devices and are communicatively connected through wired or wireless means. The AI model 130 is, for example, a large language model (LLM), is composed of an artificial neural network with many parameters, and is trained on a large amount of unlabeled text using self-supervised learning or semi-supervised learning. The LLM is, for example, ChatGPT, GPT4, LLaMA-65B, PaLM-62B, etc. The models all have very good results in various natural language processing (NLP) evaluations. Evaluation items include common sense reasoning, closed-book question and answer, reading comprehension, mathematical reasoning, program code generation, massive multitask language understanding (MMLU), etc. In recent years, major technology leaders have also actively reduced the LLMs while having more powerful capabilities.

In an embodiment, a UI/UX designer team may collect past interview data to be compiled into three key information (such as difficulty point, usage target, and relevant data) and the website type and an implementation function to be finally implemented to establish an input corpus and an output result (including an output corpus). Inputs for training the AI model 130 are the three key information. Outputs for training the AI model 130 are the website type and the implementation function. A result obtained by subsequent analysis using the AI model 130 may be fed back to the AI model 130 for retraining to improve the accuracy of the AI model 130.

The AI model 130 adopted in the embodiment has the following capabilities: sentence deconstruction, which may disassemble the structure of a sentence, such as nouns and verbs; semantic understanding, which may understand the context, analyze the semantics, and summarize; possession of general domain knowledge to learn knowledge via training with a large amount of general domain data; topic modeling, which may analyze multiple keywords and induce a corresponding topic; association, which may associate things related to different levels corresponding to the topic; word embedding, which may transform words and sentences into semantic distance space; and sentence generation, which may generate sentences according to a situation, an emotion, a role, etc. and is highly anthropomorphic.

The AI model 130 has a strong generalization ability. When the AI model 130 is applied to different tasks, retraining is not required, and only a relevant prompt (including a task description, an example, an output format, etc.) needs to be given to output the corresponding result. Such a method is referred to as in-context learning, and the output result varies according to the input prompt. The design of the prompt is also referred to as prompt engineering. The prompt engineering is executed by the processor 110. One or more corresponding prompts are selected or generated via designing and according to a current status (such as Step S331 of function induction, Step S332 of function association, Step S333 of function comparison, and Step S350 of third query). Finally, the AI model 130 is driven through the prompt to obtain the desired result.

Figure 2:
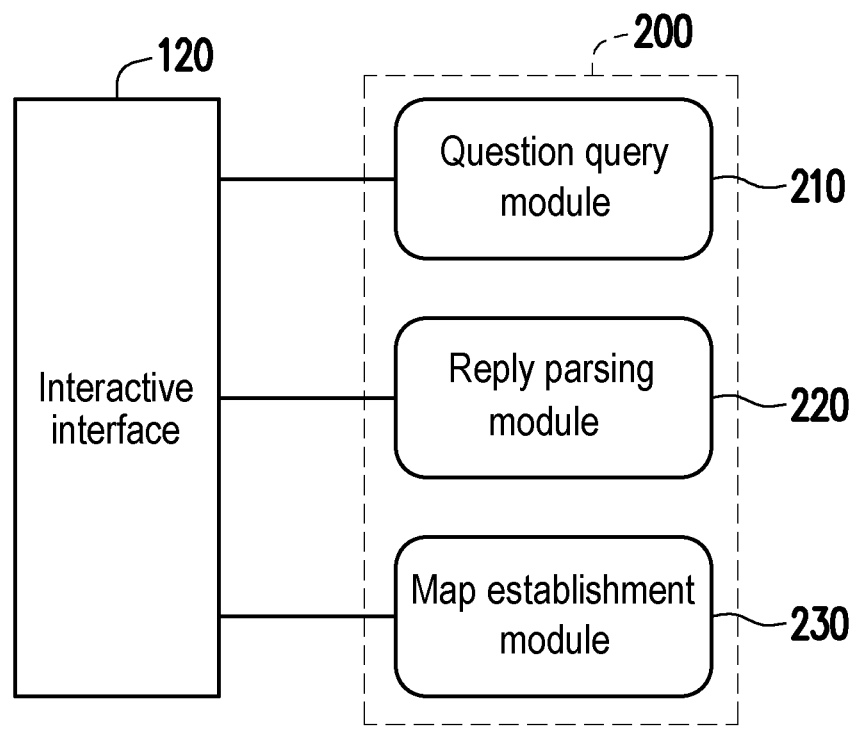
FIG. 2 is a schematic diagram of a robot structure according to an embodiment of the disclosure.

FIG. 2 is a schematic diagram of a robot structure according to an embodiment of the disclosure. The embodiment includes three roles, that is, the user, a robot 200, and the AI model 130 (refer to FIG. 1). Based on the professional knowledge and experience of UI/UX design, the robot 200 guides the user in answering questions, and captures the key information, such as data to be presented, a data source, a usage scenario, and a development function, needed for website design with the help of the ability of the AI model 130. The key information is compiled into a function map. Finally, the final version of the function map is generated after confirmation with the user.

Please refer to FIG. 2. The robot 200 includes a question query module 210, a reply parsing module 220, and a map establishment module 230. The module is, for example, a software module composed of one or more program codes stored in a memory. The memory is, for example, any type of fixed or removable random access memory (RAM), read-only memory (ROM), flash memory, hard disk, other similar devices, or a combination of the devices. In addition, the question query module 210, the reply parsing module 220, and the map establishment module 230 may also be implemented by hardware chips or circuits.

The processor 110 drives the question query module 210, the reply parsing module 220, and the map establishment module 230 to execute corresponding functions. The question query module 210 is configured to call the AI model 130 to generate corresponding questions according to the key information. The reply parsing module 220 is configured to call the AI model 130 to parse a reply content to a query. The map establishment module 230 is configured to call the AI model 130 to find a function list based on a result obtained by the reply parsing module 220 to establish the function map.

In order to facilitate understanding, FIG. 3 to FIG. 11B are listed below and explained together with FIG. 1 and FIG. 2.

Figure 3:
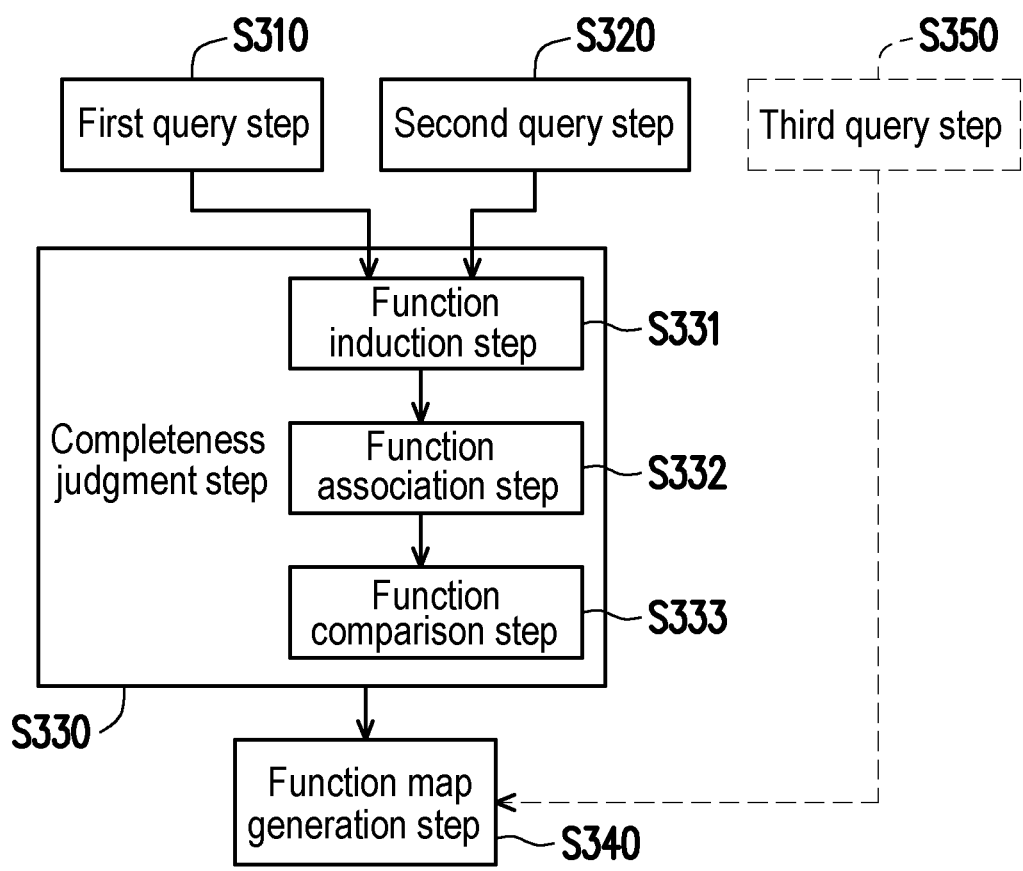
FIG. 3 is a flowchart of a function map generation method according to an embodiment of the disclosure.
Figure 4:
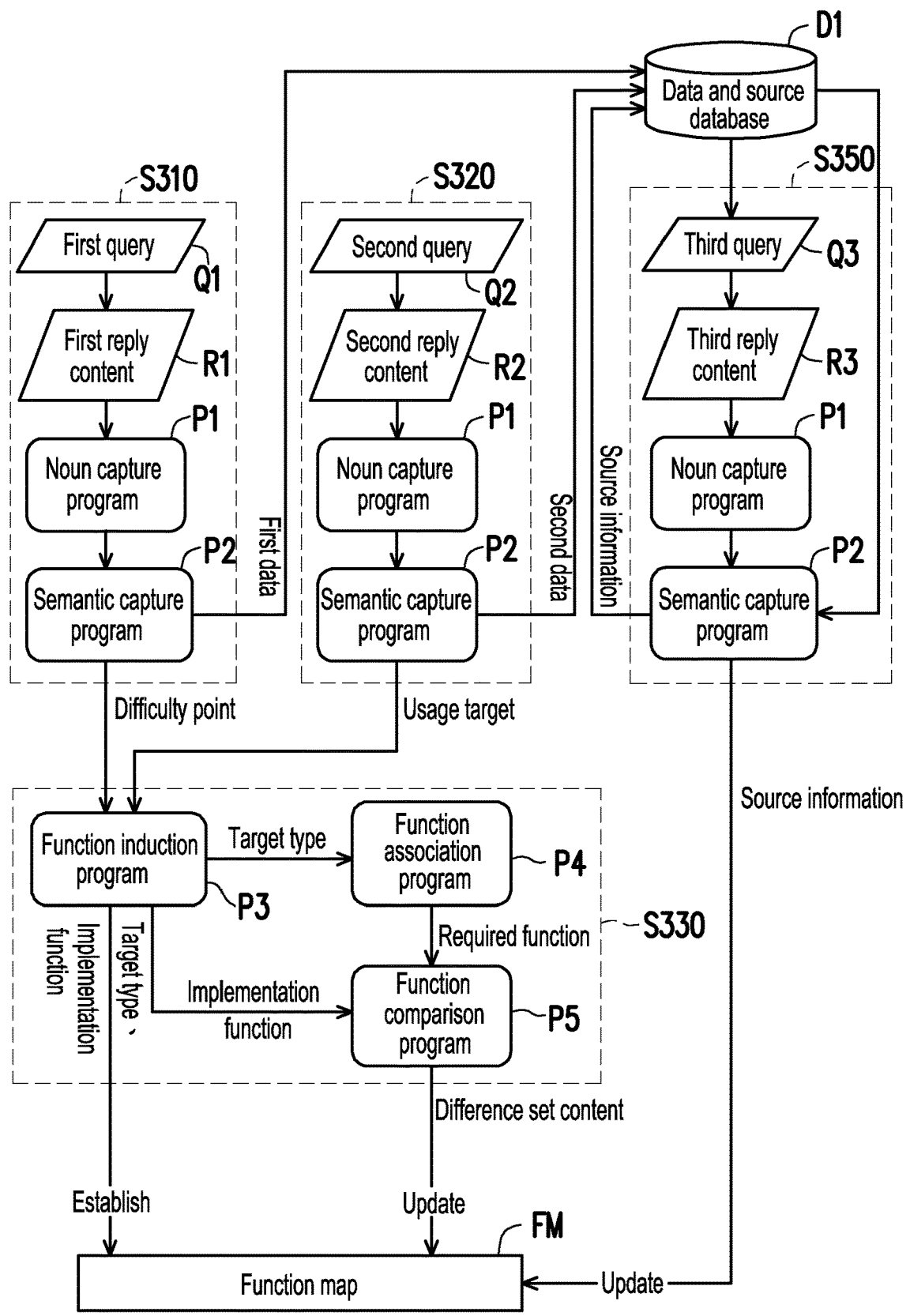
FIG. 4 is a schematic structural diagram of generating a function map according to an embodiment of the disclosure.
Figure 6:
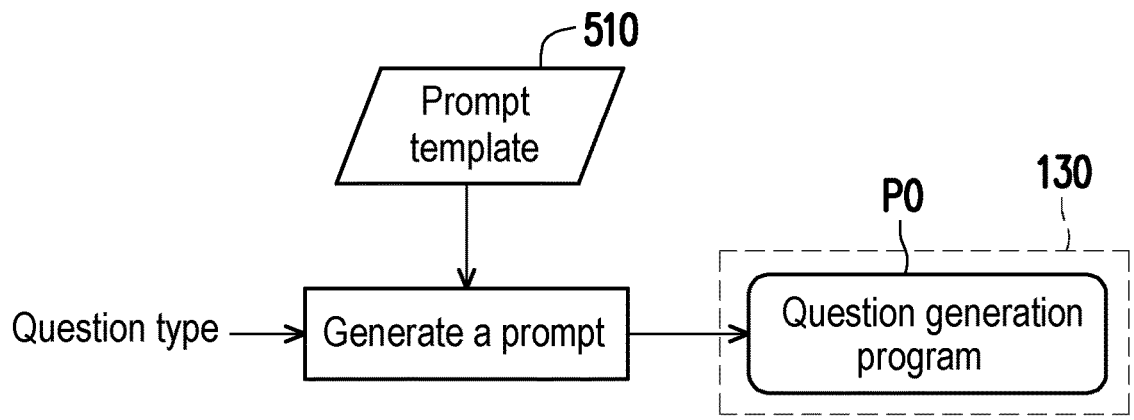
FIG. 6 is a schematic structural diagram of a problem generation program according to an embodiment of the disclosure.
Figure 7:
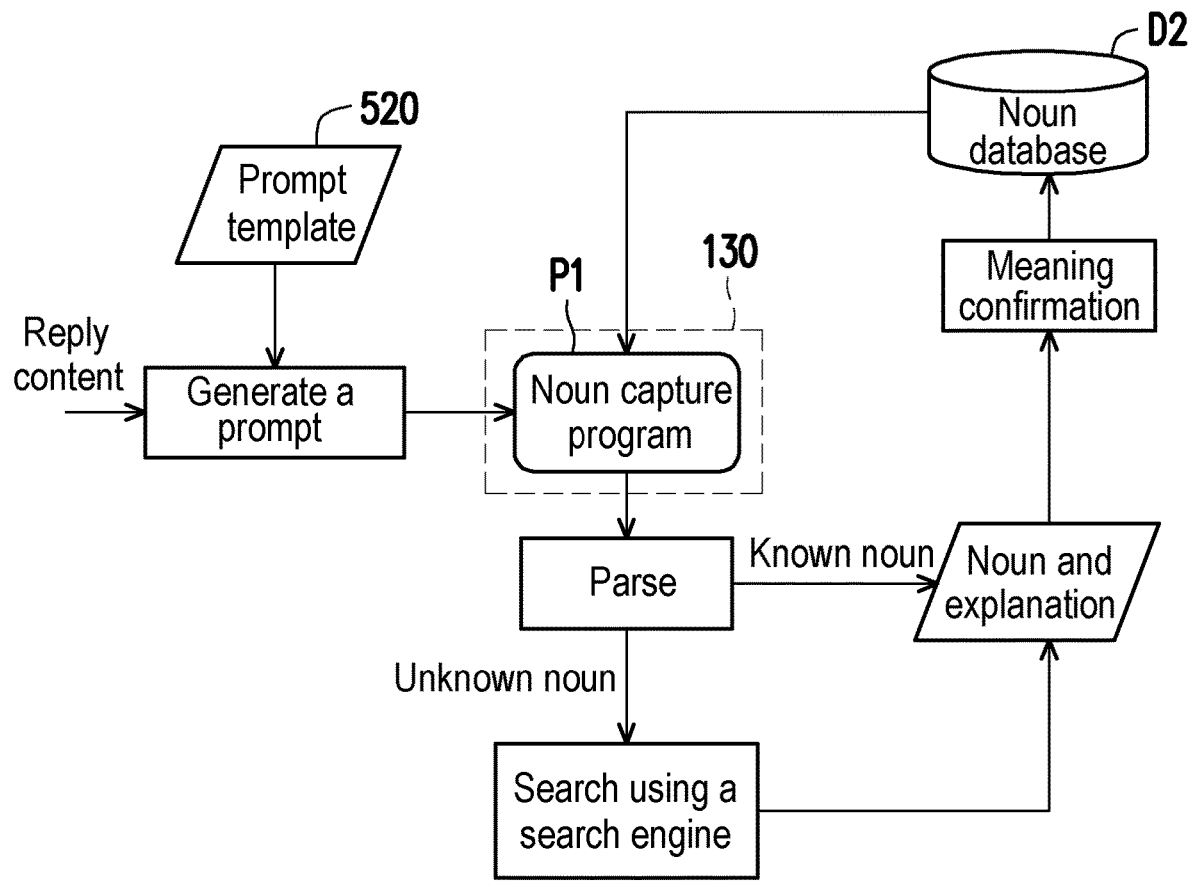
FIG. 7 is a schematic structural diagram of a noun capture program according to an embodiment of the disclosure.
Figure 8:
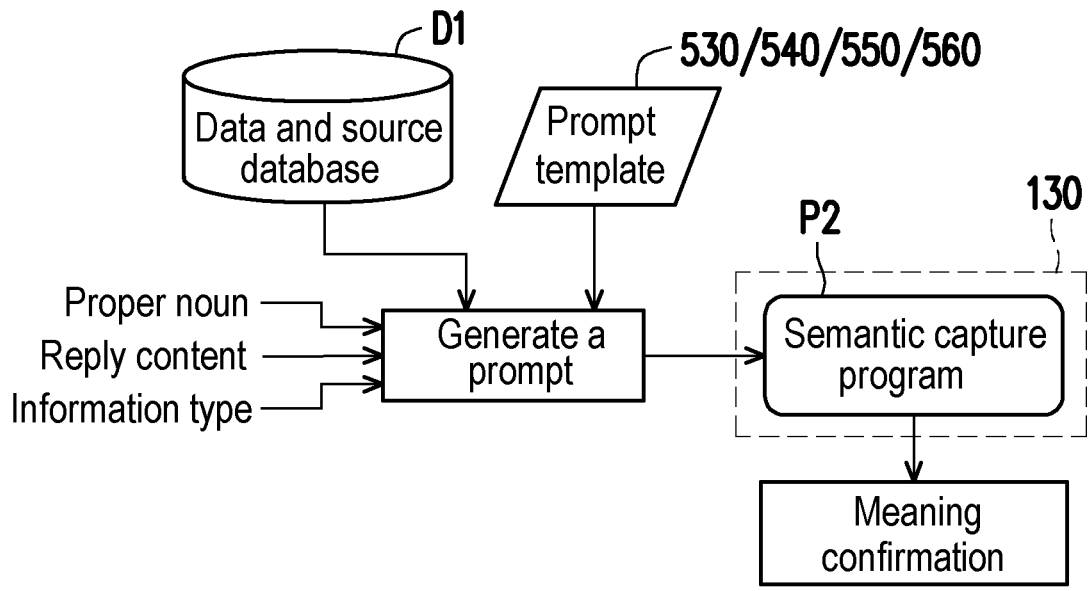
FIG. 8 is a schematic structural diagram of a semantic capture program according to an embodiment of the disclosure.
Figure 9:
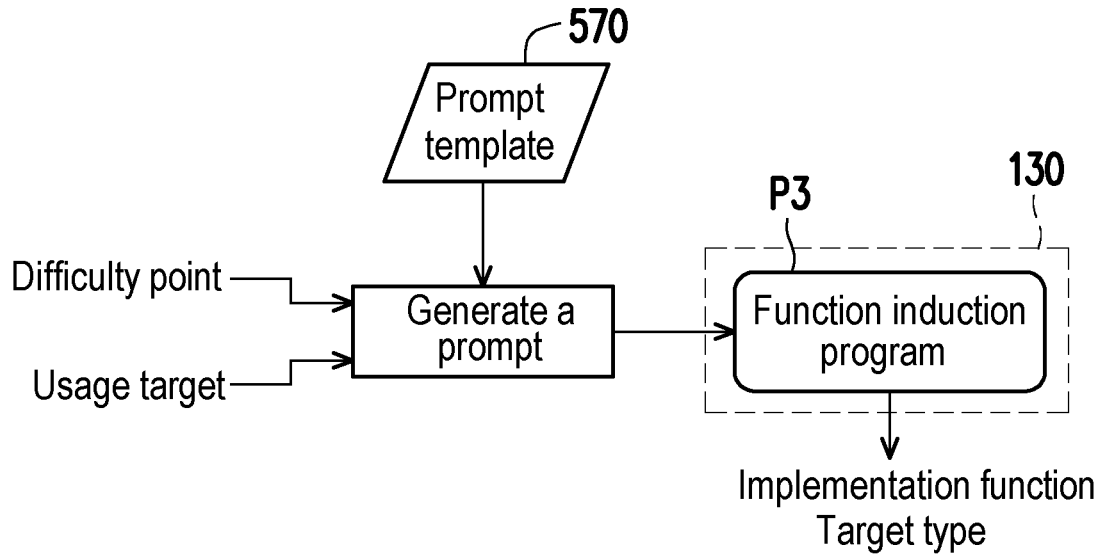
FIG. 9 is a schematic structural diagram of a function induction program according to an embodiment of the disclosure.
Figure 10:
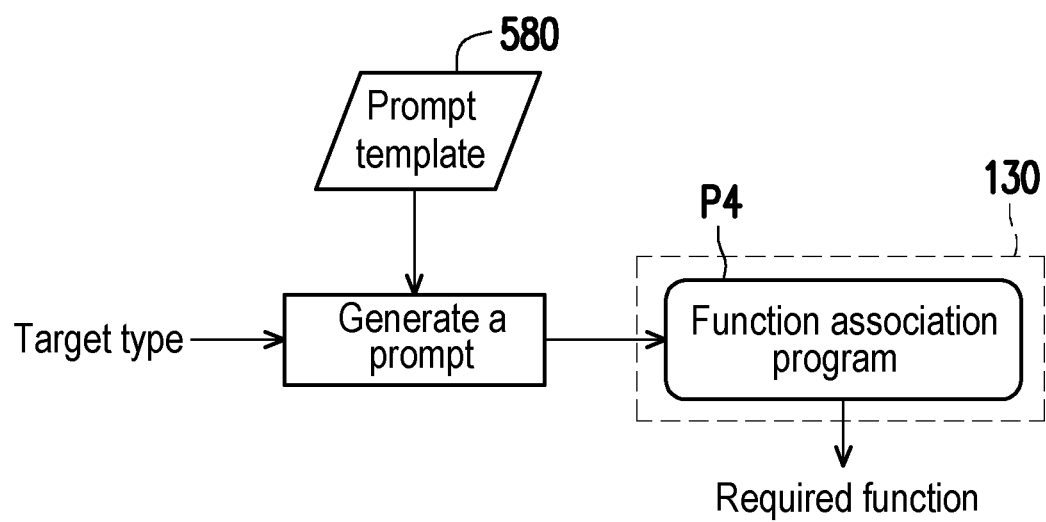
FIG. 10 is a schematic structural diagram of a function association program according to an embodiment of the disclosure.

FIG. 3 is a flowchart of a function map generation method according to an embodiment of the disclosure. FIG. 4 is a schematic structural diagram of generating a function map according to an embodiment of the disclosure. FIG. 5A to FIG. 5C are schematic diagrams of multiple prompt templates according to an embodiment of the disclosure. FIG. 6 is a schematic structural diagram of a problem generation program according to an embodiment of the disclosure. FIG. 7 is a schematic structural diagram of a noun capture program according to an embodiment of the disclosure. FIG. 8 is a schematic structural diagram of a semantic capture program according to an embodiment of the disclosure. FIG. 9 is a schematic structural diagram of a function induction program according to an embodiment of the disclosure. FIG. 10 is a schematic structural diagram of a function association program according to an embodiment of the disclosure. FIG. 11A and FIG. 11B are schematic diagrams of a content presented by an interactive interface according to an embodiment of the disclosure.

First, please refer to FIG. 3. The function map generation method includes Step S310 of first query, Step S320 of second query, Step S330 of completeness judgment, and Step S340 of function map generation. Step S330 of completeness judgment includes Step S331 of function induction, Step S332 of function association, and Step S333 of function comparison. In addition, the function map generation method may further add Step S350 of third query. Step S350 of third query is not a necessary step and may or may not be added depending on the situation.

Please refer to FIG. 4. A first query Q1, a second query Q2, and a third query Q3 used in Step S310 of first query, Step S320 of second query, and Step S350 of third query are generated by the question query module 210. The question type of the first query Q1 is the difficulty point, the question type of the second query Q2 is the usage target (including usage purpose and audience), and the question type of the third query Q3 is the data source. Specifically, the question query module 210 selects the corresponding prompt template according to the question type. Then, the AI model 130 is responsible for generating the corresponding first query Q1, second query Q2, or third query Q3. The questions generated by the AI model 130 may be anthropomorphic, including a dynamic, non-rigid, polite, and service-oriented tone.

Please refer to FIG. 6. For the first query Q1 corresponding to the difficulty point, the question query module 210 adopts a prompt template 510 according to the question type of "difficulty point that website needs to solve" and brings in the key information corresponding to the "difficulty point". Also, previously collected information such as a proper noun and a field may be simultaneously supplemented in the context to generate a final prompt. After deciding to adopt the prompt template 510, the content of the question type "difficulty point that website needs to solve" is filled into a region 511 in the prompt template 510 to obtain the prompt. Then, a question generation program P0 executed using the AI model 130 to generate the corresponding first query Q1 based on the prompt. For example, as shown in the first query Q1 in FIG. 11A, "in order to better assist you in developing your website, I need to understand difficulty points you face to provide the most effective support. Please share some specific challenges that your website needs to solve, so I can provide more specific advice and assistance". The second query Q2 and the third query Q3 may be analogized.

After generating the query, the question query module 210 presents the query (the first query Q1, the second query Q2, or the third query Q3) on the interactive interface 120, and the corresponding reply content (a first reply content R1, a second reply content R2, or a third reply content R3) is received by the interactive interface 120. Taking FIG. 11A as an example, after the interactive interface 120 presents the first query Q1, and the first reply content R1 is then received through the interactive interface 120.

Referring to FIG. 3 and FIG. 4, in Step S310 of first query, the processor 110 obtains the difficulty point and first data related to the difficulty point from the first reply content R1 of the first query Q1 corresponding to the difficulty point using the AI model 130, and stores the first data to a data and source database D1.

Specifically, referring to FIG. 7, the reply parsing module 220 selects a prompt template 520 based on the first reply content R1, then fills the first reply content R1 into a region 521 in the prompt template 520 to generate a prompt corresponding to the first reply content R1, and then executes a noun capture program P1 based on the prompt corresponding to the first reply content R1 through the AI model 130 to obtain a first noun response result.

The noun capture program P1 has the ability to call the AI model 130 through the prompt, so as to capture a proper noun and a strange or inconsistent noun that appears in the first reply content R1, and explain the meaning thereof. Next, during the "parsing" process, the reply parsing module 220 judges whether a noun list listed in the first noun response result includes a known noun (a noun that the AI model 130 knows and can interpret) or an unknown noun. For example, whether a noun is an unknown noun may be judged through searching whether a word string such as "online search" or "search online" appears in the first noun response result (as shown in Example 1-1 below). If the noun is an unknown noun, search may be further conducted using a search engine to obtain a corresponding explanation. Afterwards, the meaning of the noun and the corresponding explanation are confirmed. For example, the noun and the explanation are presented to the interactive interface 120 for the user to confirm. Finally, the result is stored in a noun database D2. If no relevant explanation is found, the explanation provided by the user may also be received through the interactive interface 120.

Example 1-1

| | |
|---|---|
| First reply content | At present, data of each department cannot be updated in real time, and a part of the data needs to be manually transferred, so we wish to make a panel that may instantly see aaaaaa. |
| First noun response result | In the provided content, only 'aaaaaa' is a noun with peculiar or ambiguous significance, necessitating online research for relevant information to provide clarification. 1. aaaaaa-the noun does not have enough context and obvious meaning in the content provided, so no explanation can be provided. In order to obtain further information about 'aaaaaa,' additional online research or more context needs to be provided." |

That is, if there is an unknown noun that the AI model 130 cannot understand, the relevant meaning will be searched through the search engine, and the meaning will then be confirmed and provided to the user for reconfirmation. Regardless of whether the finally obtained noun is known or unknown, the meaning is displayed to the user for confirmation, including modifications.

In addition, during the "parsing" process, if the reply parsing module 220 confirms that there is currently no proper noun and inconsistent or strange noun through searching for a default word string such as "no appearance", "not found", "did not appear", and "did not find", the process will end without proceeding to the next step, which means that the step of meaning confirmation will not be entered and the list of the noun database D2 will not be updated. For example, referring to Example 2-1, the first noun response result shows "no appearance", so it is judged that there is no proper noun and inconsistent or strange noun.

Example 2-1

| | |
|---|---|
| First reply content | Because our park is very large and a lot of information is managed by different departments, we wish to make a viewing panel to see various data, especially the flow of people, which includes the total park entry count, the number of people on site, and the average park stay duration. |
| First noun response result | No proper noun and strange or inconsistent noun appears in the content provided. Therefore, no relevant noun or explanation can be provided. |

Next, referring to FIG. 8, the reply parsing module 220 executes a semantic capture program P2 through the AI model 130 to obtain the difficulty point and the first data related to the difficulty point based on the first reply content R1 and the first noun response result. The semantic capture program P2 aims to capture key information through semantic understanding through the AI model 130. "Generate prompt" and the semantic capture program P2 have different results based on "information type" input. For example, the prompt template is selected according to the "information type", and the AI model 130 parses a semantic response result to be output according to the "information type".

For example, referring to Example 2-2 below, the reply parsing module 220 selects a prompt template 530 based on the information type, then fills the first reply content R1 into a region 531 in the prompt template 530 and fills the question type (for example, "difficulty point that website needs to solve") into a region 532 to generate the prompt for semantic capture, and then executes the noun capture program P1 based on the generated prompt through the AI model 130 to obtain a first semantic response result (such as including "difficulty point": . . . ", "data: . . . "). After that, the meaning of the first semantic response result is confirmed. For example, the first semantic response result is presented to the interactive interface 120 for the user to confirm.

Example 2-2

| | |
|---|---|
| Question type | Difficulty point that website needs to solve |
| First reply content | Because our park is very large and a lot of information is managed by different departments, we wish to make a viewing panel to see various data, especially the flow of people, which includes the total park entry count, the number of people on site, and the average park stay duration. |
| Difficulty point | Difficulty point: park information is scattered in different departments and needs to be integrated; and it is necessary to track |

-continued

| | various data of the flow of people, which includes the total park entry count, the number of people on site, and the average park stay duration. |
|---|---|
| First data | Data: the total park entry count, the number of people on site, and the average park stay duration. |

In another embodiment, referring to Example 1-2 below, it is assumed that the reply parsing module 220 selects a prompt template 550 based on the information type, then fills the first reply content R1 into a region 551 in the prompt template 550, fills the question type (for example, "difficulty point that website needs to solve") into a region 553, and fills the proper noun and the explanation thereof (for example, "aaaaaa: refers to the cycle growth rate of a tumor, and the size is calculated once every 1 month") into a region 552, so as to generate the prompt for semantic capture, and then executes the noun capture program P1 based on the generated prompt through the AI model 130 to obtain the first semantic response result (such as including "difficulty point: . . . ", "data: . . . "). The purpose of adding the collected proper noun into the prompt is to prevent accidental capture or missed capture.

Example 1-2

| Question type | Difficulty point that website needs to solve |
|---|---|
| First reply content | At present, data of each department cannot be updated in real time, and a part of the data needs to be manually transferred, so we wish to make a panel that may instantly see aaaaaa. |
| Difficulty point | Difficulty point: data of department cannot be updated in real time, and a part of the data needs to be manually transferred. |
| First data | Data: aaaaaa. |

Next, referring to FIG. 3 and FIG. 4, in Step S320 of second query, the processor 110 obtains the usage target and second data related to the usage target from the second reply content R2 of the second query Q2 corresponding to the usage target using the AI model 130, and stores the second data in the data and source database D1.

The reply parsing module 220 generates the prompt corresponding to the second reply content R2, and then executes the noun capture program P1 based on the prompt corresponding to the second reply content R2 through the AI model 130 to obtain a second noun response result. Afterwards, the reply parsing module 220 executes the semantic capture program P2 through the AI model 130 to obtain the usage target and second data related to the usage target based on the second reply content R2 and the second noun response result. Here, the usage target includes a usage audience and a usage purpose.

The processes of the noun capture program P1 and the semantic capture program P2 executed in Step S320 of second query are similar to those in Step S310 of first query. First, whether there is a proper noun in the second reply content R2 is judged through the noun capture program P1. For example, as shown in Example 3 below, it is assumed that the second reply content R2 is "website will be monitored for internal use only and will not be open to the public". The noun capture program P1 judges that there is no proper noun and strange or inconsistent noun in the content provided. The reply parsing module 220 adopts a prompt template 540, fills the second reply content R2 into a region 541 in the prompt template 540 and fills the question type (for example, "who uses the website? what is the purpose?") into a region 542 to generate a corresponding prompt, and then executes the semantic capture program P2 through the AI model 130 to obtain the usage target and the second data.

Example 3

| Question type | Who uses the website? what is the purpose? |
|---|---|
| Second reply content | Website will be monitored for internal use only and will not be accessible to external parties. |
| Second noun response result | No proper noun and strange or inconsistent noun appears in the content provided. Therefore, no relevant noun or explanation can be provided. |
| Usage target | Usage purpose and audience: website will be monitored for internal use only and will not be accessible to external parties. |
| Second data | Data: no specific data is mentioned. |

In Step S350 of third query, the processor 110 obtains a data source from the third reply content R3 of the third query Q3 corresponding to the data source using the AI model 130. After receiving the third reply content R3 of the third query Q3 corresponding to the data source, a prompt corresponding to the third reply content R3 is generated. The noun capture program P1 is executed based on the corresponding prompt through the AI model 130 to obtain a third noun response result from the third reply content R3, and the semantic capture program P2 is executed through the AI model 130 to obtain source information based on the third reply content R3 and the third noun response result, and store the source information in the data and source database D1.

In Step S350 of third query, the processor 110 queries the user for the data source according to the first data obtained in Step S310 of first query and the second data obtained in Step S320 of second query. After obtaining an answer from the user, whether capture of the source is completed is judged. If the capture is not completed, the information is first stored in the database, and another query is generated using the question query module 210, and the cycle is continued in this order until capture of all data sources is completed, as shown in Examples 4 and 5 below.

Example 4

| Third query | Relevant data and files from the content you just mentioned are as follows: 1. Total park entry count 2. Number of people on site 3. Average park stay duration What are the sources of the data and files? |
|---|---|
| Third reply content | At present, the total park entry count and the number of people on site are counted by staff through counters. |
| Third noun response result | No proper noun and strange or inconsistent noun appears in the content provided. Therefore, no relevant noun or explanation can be provided. |

Example 5

| | |
|---|---|
| Source information | 1. Total park entry count: counted by staff through a counter.<br>2. Number of people on site: counted by staff through a counter. |

| | |
|---|---|
| Fourth query | Could you please supplement the data source for the average park stay duration? |
| Fourth reply content | The average park stay duration is roughly calculated through a sensor of an access control gate. |
| Third noun response result | No proper noun and strange or inconsistent noun appears in the content provided. Therefore, no relevant noun or explanation can be provided. |
| Source information | 1. Average park stay duration k: calculated through a sensor of an access control gate. |

The processes of the noun capture program P1 and the semantic capture program P2 executed in Step S350 of third query are similar to those of Step S310 of first query. First, whether there is a proper noun in the second reply content R2 is judged through the noun capture program P1. Afterwards, in the semantic capture program P2, the reply parsing module 220 adopts the prompt template 550, fills the third reply content R3 into a region 561 in the prompt template 560, and fills the first data and the second data into a region 562, so as to generate a corresponding prompt. Then, the noun capture program P1 is executed based on the prompt through the AI model 130 to obtain the source information.

Then, Step S330 of completeness judgment is entered. In Step S331 of function induction, the processor 110 obtains an implementation function and a target type based on the difficulty point and the usage target using the AI model 130. The map establishment module 230 generates a prompt corresponding to the difficulty point and the usage target, and then executes a function induction program P3 based on the prompt using the AI model 130 to obtain the implementation function and the target type.

Referring to FIG. 9, the map establishment module 230 selects a prompt template 570, fills the difficulty point into a region 571, and fills the usage target (the usage purpose and audience) into a region 572, so as to generate the corresponding prompt. Then, the function induction program P3 is executed based on the prompt using the AI model 130 to obtain the implementation function and the target type. The AI model 130 can effectively induce the implementation function and analyze the target type (for example, the website type), and the AI model 130 parses the implementation function and the website type with "function requirement: . . . " and "website type: . . . ", and output, as shown in Example 6.

Example 6

| | |
|---|---|
| Difficulty point | Park information is scattered in different departments and needs to be integrated; and it is necessary to track various data of the flow of people, which includes the total park entry count, the number of people on site, and average park stay duration. |
| Usage target | The website will be monitored for internal use only and will not be accessible to external parties. |
| Implementation function | Integrating information from various departments within the park area; tracking total park entry count, the number of people on site, and average park stay duration. |
| Target type | Internal monitoring website. |

In Step S332 of function association, the processor 110 obtains a required function based on the target type using the AI model 130. The map establishment module 230 generates a prompt corresponding to the target type, and executes a function association program P4 based on the prompt using the AI model 130 to obtain the required function.

Referring to FIG. 10 and Example 7, the map establishment module 230 selects a prompt template 580, fills the target type into a region 581, so as to generate the corresponding prompt, and then associates other required functions based on the target type using a general domain knowledge ability of the AI model 130 to supplement professional knowledge that the user does not possess.

Example 7

| | |
|---|---|
| Target type | Internal monitoring website. |
| Required function | User authentication and permission management, real-time monitoring data visualization, alarm and notification system, logging and auditing functions. |

The AI model 130 obtains the required function related to implementation using professional associations. Since the AI model 130 has a strong associative ability, the obtained prompt mentions that the obtained required functions are classified according to the level of importance and only outputs the required functions with high levels of importance, but may be determined according to requirements and not limited thereto.

Afterwards, in Step S333 of function comparison, the processor 110 executes a function comparison program P5 using the AI model 130 to perform semantic comparison between the implementation function and the required function to obtain a difference set content. For example, after obtaining the "required function" and the "implementation function", a word embedding ability of the AI model 130 is used to perform the semantic comparison. The main purpose of the process is to obtain intersection, that is, to add the "required function" actually used in implementation in addition to the "implementation function" proposed by the user. In order to ensure that the "required function" and the "implementation function" do not overlap, in Step S333 of function comparison, overlapping items in the "required function" and the "implementation function" are eliminated to obtain and output the difference set content.

For example, as shown in Example 6, the required functions based on the response from the user include integrating the park information from different departments; and tracking the total park entry count, the number of people on site, and the average park stay duration. The required functions obtained through associating by the AI model 130 are as shown in Example 7 and include the user authentication and permission management; the real-time monitoring data visualization; the alarm and notification system; and the logging and auditing functions. After comparison, the difference set content includes the user authentication and permission management; the real-time monitoring data visualization; the alarm and notification system; and the logging and auditing functions.

Afterwards, in Step S340, the processor 110 generates a function map based on the target type, the implementation function, and the difference set content. Furthermore, after obtaining the target type and the implementation function, the processor 110 may preliminarily establish a function map FM. Afterwards, after obtaining the difference set content, the difference set content is further added to update the function map FM. Also, after obtaining the source information, the function map FM is updated based on the source information.

The function map FM is, for example, composed of four parts, that is, website type, function, data, and existing systems and processes. The function map FM is presented in the form of a mind map and is arranged from abstract to concrete. The website type at the topmost layer, is the core of the entire function map FM, and determines the direction of the entire website. In addition, function items required for constructing the website obtained based on the function induction program P3 and the function association program P4 are placed in the position of the second layer.

Referring to FIG. 11A and FIG. 11B, the embodiment illustrates the content presented by the interactive interface 120 with website design. First, the processor 110 calls the AI model 130 using the question query module 210 to generate the first query Q1 for querying the difficulty point (a pain point) that the website needs to solve, and presents the first query Q1 to the interactive interface 120. Then, the first reply content R1 corresponding to the first query Q1 is received through the interactive interface 120. After that, the processor 110 calls the AI model 130 using the reply parsing module 220 to obtain the difficulty point and the first data, and generates corresponding confirmation information A1 based on the difficulty point and the first data to be presented to the interactive interface 120 for the user to confirm.

Next, the processor 110 calls the AI model 130 using the question query module 210 to generate the second query Q2 for querying the usage target (the usage purpose and audience) of the website to be presented to the interactive interface 120. Next, the second reply content R2 corresponding to the second query Q2 is received through the interactive interface 120. After that, the processor 110 calls the AI model 130 using the reply parsing module 220 to obtain the usage target (the usage purpose and audience) and the second data, and generates corresponding confirmation information A2 based on the usage target and the second data to be presented to the interactive interface 120 for the user to confirm.

Afterwards, the processor 110 calls the AI model 130 using the question query module 210 to generate a third query Q3-1 for querying the data source, and presents the third query Q3-1 to the interactive interface 120. Then, a corresponding reply content R3-1 is received through the interactive interface 120. Afterwards, the processor 110 calls the AI model 130 using the reply parsing module 220 to obtain the source information, and generates corresponding confirmation information A3-1 based on the source information to be presented to the interactive interface 120 for the user to confirm.

In addition, since the reply content R3-1 does not completely answer sources of all data, the processor 110 then calls the AI model 130 using the question query module 210 to generate a fourth query Q3-2 querying the data source, and presents the fourth query Q3-2 to the interactive interface 120. Then, a corresponding reply content R3-2 is received through the interactive interface 120. Afterwards, the processor 110 calls the AI model 130 using the reply parsing module 220 to obtain the source information, and generates corresponding confirmation information A3-2 based on the source information to be presented to the interactive interface 120 for the user to confirm.

Afterwards, the processor 110 utilizes the map establishment module 230 to invoke the AI model 130 to generate function map information A4 corresponding to the function map, and presents the function map information A4 to the interactive interface 120 for the user to confirm.

The above embodiment may be divided into the following four stages in order.

In a first stage, in Step S310 of first query, the robot 200 queries and captures the difficulty point that the website needs to solve, while also capturing keywords of the data and the files mentioned in the reply content. In Step S320 of second query, the robot 200 queries and captures the usage audience and purpose of the website. After that, in Step S331 of function induction, the robot 200 analyzes the website type (the target type) through the AI model 130 based on the information captured in Step S310 of first query and Step S320 of second query to obtain the website type and the corresponding implementation function, so as to establish the preliminary function map FM.

In a second stage, in Step S332 of function association, based on the website type, the robot 200 calls the AI model 130 to associate the common required functions of this type of website, obtains the functions with high levels of importance by dividing according to the level of importance, and compares the completeness with the previously obtained implementation functions, focusing on the required functions. If it is found that the implementation function obtained in Step S331 of function induction is missing, the function map FM is updated. At this time, the capture of the functions and the data of the function map FM are completed.

In a third stage, in addition to the key information captured in Step S320 of second query in the first stage, the robot 200 captures the keywords of the data and the files to be sent to Step S350 of third query to query the sources of the data and the files, so as to further capture the source information and update the function map FM.

In a fourth stage, the generated function map FM is given to the user for confirmation. If there is no issue, the function map FM is final. The UI/UX designer receives the function map FM for subsequent website design.

In an embodiment, the function map FM generated by the processor 110 may be imported into a prototype website development platform with AI functions, so as to generate prototype website program codes. Afterwards, the processor 110 packages and deploys the website program codes to a cloud environment through a compilation engine, and records the browsing URL. Then, the browsing URL is returned to the user through the robot 200 for the user to further browse the webpage. For example, after the robot 200 records the browsing URL, the browsing URL (digital signals) are packaged into a set of logical transmission data (that is, data frame), and a communication chip or a communication circuit is driven to transmit the transmission data to a pre-designated electronic device related to the user via email, short message service (SMS), push technology, etc.

In summary, the system of the disclosure may operate around the clock to improve the work efficiency of the designer. In addition, the disclosure adopts the AI model with an in-depth conversation ability and a humanized speaking manner to provide a better customer experience than traditional robots. Based on the professional knowledge of the designer, the AI model may effectively capture the key information. The proper noun understanding mechanism can quickly eliminate cognitive inconsistencies between two parties to improve the efficiency of requirement capture. Directly generating the function map enables the designer to bypass the initial requirement exploration period and directly jump into clear requirements to accelerate the overall design and development process.

What is claimed is:

1. A function map generation method based on an artificial intelligence model, executing a plurality of steps below through a processor, comprising:
   a first query step of obtaining a difficulty point and first data related to the difficulty point from a first reply content of a first query corresponding to the difficulty point using the artificial intelligence model;
   a second query step of obtaining a usage target and second data related to the usage target from a second reply content of a second query corresponding to the usage target using the artificial intelligence model;
   a completeness judgment step, comprising:
      a function induction step of obtaining an implementation function and a target type based on the difficulty point and the usage target using the artificial intelligence model;
      a function association step of obtaining a required function based on the target type using the artificial intelligence model; and
      a function comparison step of performing semantic comparison between the implementation function and the required function to obtain a difference set content using the artificial intelligence model; and
   a function map generation step of generating a function map based on the target type, the implementation function, and the difference set content.

2. The function map generation method according to claim 1, wherein the first query step comprises:
   generating a prompt corresponding to the first reply content;
   executing a noun capture program based on the prompt corresponding to the first reply content through the artificial intelligence model to obtain a first noun response result; and
   executing a semantic capture program through the artificial intelligence model to obtain the difficulty point and the first data related to the difficulty point based on the first reply content and the first noun response result.

3. The function map generation method according to claim 2, wherein the second query step comprises:
   generating a prompt corresponding to the second reply content;
   executing the noun capture program based on the prompt corresponding to the second reply content through the artificial intelligence model to obtain a second noun response result from the second reply content; and
   executing the semantic capture program through the artificial intelligence model to obtain the usage target and the second data related to the usage target based on the second reply content and the second noun response result.

4. The function map generation method according to claim 2, further comprising:
   a third query step, comprising:
      receiving a third reply content of a third query corresponding to a data source;
      generating a prompt corresponding to the third reply content;
      executing the noun capture program based on the prompt corresponding to the third reply content through the artificial intelligence model to obtain a third noun response result from the third reply content; and
      executing the semantic capture program through the artificial intelligence model to obtain source information based on the third reply content and the third noun response result.

5. The function map generation method according to claim 4, wherein the function map generation step further comprises:
   updating the function map based on the source information.

6. The function map generation method according to claim 1, wherein the function induction step comprises:
   generating a prompt corresponding to the difficulty point and the usage target; and
   executing a function induction program based on the prompt using the artificial intelligence model to obtain the implementation function and the target type.

7. The function map generation method according to claim 1, wherein the function association step comprises:
   generating a prompt corresponding to the target type; and
   executing a function association program based on the prompt using the artificial intelligence model to obtain a required function.

8. The function map generation method according to claim 1, wherein the function map generation step comprises:
   generating the function map based on the implementation function and the target type after the function induction step; and
   updating the function map based on the difference set content after the function comparison step.

9. A function map generation system based on an artificial intelligence model, comprising:
   an artificial intelligence model;
   an interactive interface; and
   a processor, coupled to the artificial intelligence model and the interactive interface, wherein
   in response to the interactive interface receiving a first reply content of a first query corresponding to a difficulty point, the processor is configured to: obtain the difficulty point and first data related to the difficulty point from the first reply content using the artificial intelligence model;
   in response to the interactive interface receiving a second reply content of a second query corresponding to a usage target, the processor is configured to: obtain second data for representing the usage target and related to the usage target from the second reply content using the artificial intelligence model;
   the processor is further configured to:
      obtain an implementation function and a target type based on the difficulty point and the usage target using the artificial intelligence model;
      obtain a required function based on the target type using the artificial intelligence model;

perform semantic comparison between the implementation function and the required function to obtain a difference set content using the artificial intelligence model; and generate a function map based on the target type, the implementation function, and the difference set content.

10. The function map generation system according to claim 9, wherein the processor is configured to:

generate a prompt corresponding to the first reply content;

execute a noun capture program based on the prompt corresponding to the first reply content through the artificial intelligence model to obtain a first noun response result; and execute a semantic capture program through the artificial intelligence model to obtain the difficulty point and the first data related to the difficulty point based on the first reply content and the first noun response result.

11. The function map generation system according to claim 10, wherein the processor is configured to:

generate a prompt corresponding to the second reply content;

execute the noun capture program based on the prompt corresponding to the second reply content through the artificial intelligence model to obtain a second noun response result from the second reply content; and execute the semantic capture program through the artificial intelligence model to obtain the usage target and the second data related to the usage target based on the second reply content and the second noun response result.

12. The function map generation system according to claim 10, wherein the processor is configured to:

receive a third reply content of a third query corresponding to a data source;

generate a prompt corresponding to the third reply content;

execute the noun capture program based on the prompt corresponding to the third reply content through the artificial intelligence model to obtain a third noun response result from the third reply content; and execute the semantic capture program through the artificial intelligence model to obtain source information based on the third reply content and the third noun response result.

13. The function map generation system according to claim 12, wherein the processor is configured to:

update the function map based on the source information.

14. The function map generation system according to claim 9, wherein the processor is configured to:

generate a prompt corresponding to the difficulty point and the usage target; and execute a function induction program based on the prompt using the artificial intelligence model to obtain the implementation function and the target type.

15. The function map generation system according to claim 9, wherein the processor is configured to:

generate a prompt corresponding to the target type; and execute a function association program based on the prompt using the artificial intelligence model to obtain a required function.

16. The function map generation system according to claim 9, wherein the processor is configured to:

generate the function map based on the implementation function and the target type after obtaining the implementation function and the target type; and update the function map based on the difference set content after obtaining the difference set content.

* * * * *